United States Patent [19]

Kiilunen

[11] Patent Number: 5,893,510

[45] Date of Patent: Apr. 13, 1999

[54] WELDING APPARATUS

[76] Inventor: J. Peter Kiilunen, 31785 Homewood, Farmington Hills, Mich. 48334

[21] Appl. No.: 08/834,955

[22] Filed: Apr. 7, 1997

[51] Int. Cl.$^6$ .................................................. B23K 37/02
[52] U.S. Cl. ........................ 228/45; 74/480 R; 74/490.15
[58] Field of Search ..................... 228/32, 45; 219/125.1, 219/137.7; 74/480 R, 490.12, 490.15; 414/917

[56] References Cited

U.S. PATENT DOCUMENTS

| | | | |
|---|---|---|---|
| 2,818,494 | 12/1957 | Bernard et al. | 219/130 |
| 3,046,387 | 7/1962 | Kiilunen | 219/130 |
| 3,543,989 | 12/1970 | Cooper | 228/45 |
| 4,221,953 | 9/1980 | Kiilunen | 219/125.1 |
| 4,513,902 | 4/1985 | Tzvetanov et al. | 228/45 |
| 4,532,407 | 7/1985 | Williams et al. | 219/125.1 |
| 4,664,587 | 5/1987 | Case, Jr. et al. | 414/917 |
| 4,834,440 | 5/1989 | Kato | 414/917 |
| 5,467,663 | 11/1995 | Trowbridge | 74/490.15 |
| 5,593,081 | 1/1997 | Kiilunen | 228/45 |

OTHER PUBLICATIONS

"Parts List for the Weld Mold'Arm'", Weld Mold Company, 1970.

"Weld Mold Company Ad", Weld Mold Company, circa 25 years ago.

"'Eurekamatic' Water Cooled Gun", Welding Equipment & Supply Company, circa about 1975.

*Primary Examiner*—Samuel M. Heinrich
*Attorney, Agent, or Firm*—Gifford, Krass, Groh, Sprinkle, Patmore, Anderson & Citkowski, P.C.

[57] ABSTRACT

A welding device is disclosed having an elongated actuator arm which is secured to a main post by a cross arm. The cross arm is both slidably and pivotally mounted to the main support post and also pivotally and slidably secured to the actuator arm by an arcuate link. An elongated linkage bar extends through the actuator arm and a welding gun is attached to one end of the linkage bar. An elongated handle is perpendicularly secured to the linkage bar at its other end adjacent the opposite end of the actuator arm so that movement of the handle simultaneously moves the welding gun. The handle, furthermore, includes a hand grip at each end and the linkage bar is secured to the handle at a position closely adjacent one of the hand grips and thus at a position between the center of the handle and one of the hand grips.

12 Claims, 2 Drawing Sheets

WELDING APPARATUS

BACKGROUND OF THE INVENTION

I. Field of the Invention

The present invention relates generally to welding apparatus and, more particularly, to a welding arm assembly which provides remote control of the position of the welding gun.

II. Description of the Prior Art

For high temperature welding guns, it is necessary to control movement of the gun, and thus the welding operation, remotely from the gun itself. In order to achieve this, there have been a number of previously known welding devices to permit the welding control of the welding gun position remotely from the welding gun itself. These previously known devices include U.S. Pat. No. 4,221,953 entitled "Welding Electrode Holder and Guide," issued Sep. 9, 1980; U.S. Pat. No. 4,532,409 entitled "Welding Apparatus," issued Jul. 30, 1985; U.S. Pat. No. 3,046,387 entitled "Welding Device," issued Jul. 24, 1962; and my prior U.S. Pat. No. 5,593,081 which issued on Jan. 14, 1997.

Of the above discussed prior art patents, my prior welding apparatus set forth in the '081 patent is perhaps the most versatile and provides for a multiple axes of movements of the welding gun by utilizing an elongated actuating arm pivotally secured to an upright post via an elongated horizontal cross member. My prior U.S. patent thus provides a number of axes of movement which enable virtually unlimited control and movement of the welding gun.

One disadvantage of my prior welding apparatus, however, is that the actuating arm is disposed in line between the handle and the welding gun itself. As such, the elongated actuating arm securing the actuating lever to the welding gun necessarily obscures the field of vision for the welding gun during the operation of the welding apparatus.

Another disadvantage of my prior device is the transverse movement in a direction perpendicular to the upright support was limited.

SUMMARY OF THE PRESENT INVENTION

The present invention provides a welding device which overcomes all of the above-mentioned disadvantages of the previously known devices.

In brief, the present invention comprises an elongated actuator arm which is pivotally secured to a main support by a cross arm. Preferably, the cross arm is both pivotally and slidably mounted to both the main support as well as the actuator arm to facilitate movement of the actuator arm around multiple axes of movement.

Additionally, at least a portion of the outer periphery of the actuator arm is cylindrical in cross-sectional shape. The cylindrical portion of the actuator arm is then slidably secured to the cross arm by a tube so that the actuator arm is not only optionally rotatable relative to the tube along its longitudinal axis, but is also axially slidably mounted to the tube within predefined, but adjustable, limits. Such further movement of the actuator arm relative to the cross arm further facilitates the accurate and easy positioning of the actuator arm.

An elongated linkage bar extends through the actuator arm and has one end secured to a welding gun. An elongated handle having a hand grip at each end is then secured to the opposite end of the linkage bar so that the axis of the handle is generally perpendicular to the longitudinal axis of the linkage bar. Furthermore, the handle is secured to the linkage bar closely adjacent one of the hand grips, and thus between the center of the linkage bar and one of the hand grips, so that the actuator arm is angularly offset from the handle. In doing so, the actuator arm is offset from the field of vision between the center of the handle, i.e. the position of the operator, and the welding gun itself.

In order to further enhance the field of vision between the handle and the welding gun, an arcuate link is pivotally disposed between the cross arm and the actuator arm. The provision of the arcuate arm thus further enhances the field of vision between the handle and the welding gun.

Since the handle is secured to the linkage arm, pivotal movement of the handle about an axis perpendicular to the axis of the linkage arm axially displaces the linkage arm relative to the actuator tube which simultaneously pivots the welding gun.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
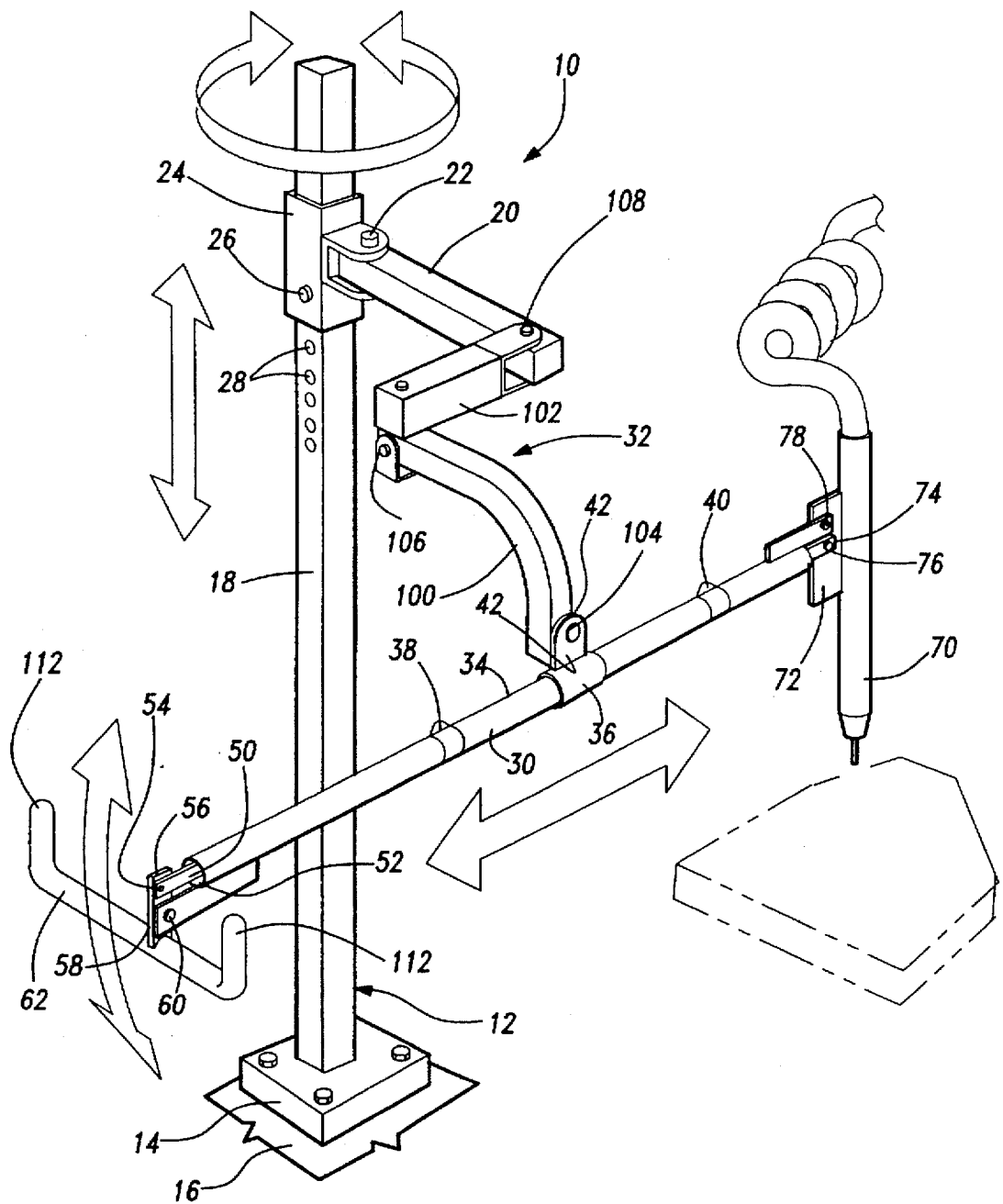
FIG. 1 is an elevational view illustrating a preferred embodiment of the present invention.

With reference first to FIG. 1, a preferred embodiment of the welding device 10 of the present invention is there shown and comprises a main support 12 having a base 14 secured to a ground support surface 16. A vertically elongated post 18 extends upwardly from the base 14 and may be of any cross-sectional shape.

Still referring to FIG. 1, the welding device 10 further comprises an elongated cross arm 20. One end of the cross member 20 is pivotally secured about a vertical axis by a pivot pin 22 to a channel member 24 having the same cross-sectional shape as the post 18. The channel member 24, in turn, is vertically slidably mounted to the post 18 so that the vertical position of the cross member 22 is controlled by the vertical position of the channel member 24. A locking pin 26 extends through registering openings in the channel member 24 and openings 28 in the post 18 so that the vertical position of the channel member 24 is not only vertically adjustable relative to the post 18 but, once adjusted, locked in position by the pin 26.

Alternatively, a threaded member may be threaded through the channel member 24 which, upon tightening, locks the channel member 24 to the post 18. In this fashion, the vertical position of the channel member 24 can be infinitely adjustable.

Alternatively, the vertical position of the channel member 24 can be adjusted using a rack and pinion or a thread shaft and nut between the channel member 24 and post 18. Either arrangement enables the vertical position of the channel member to be infinitely vertically adjusted.

Figure 2:
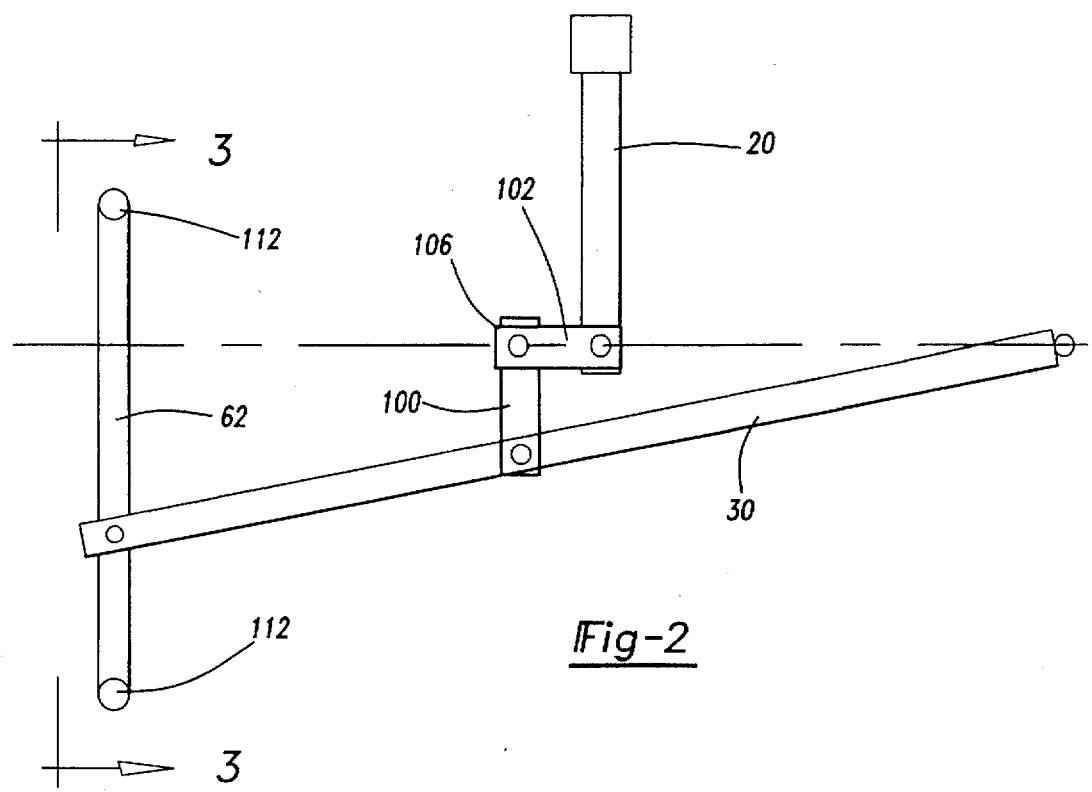
FIG. 2 is a top view illustrating the preferred embodiment of the present invention.

Still referring to FIG. 1, an elongated actuator arm 30 is secured to the end of the cross member 20 opposite from the post 18 by a connecting assembly 32. As best shown in FIGS. 1 and 2, at least a portion 34 of the actuating arm 30 is cylindrical in cross-sectional shape. The connecting assembly 32 then includes a tube 36 both slidably and optionally rotatably disposed around the arm portion 34. The tube 36 thus permits the actuator arm 30 to both optionally rotate and axially slide relative to the tube 36. A pair of stop members 38 and 40, however, are secured to the actuator arm 30 on opposite sides of the tube 36. The stop members 38 and 40 thus limit the slidable movement of the actuator arm 30 relative to the tube 36 between predefined limits. The axial position of both stop members 38 and 40, however, can be adjusted along the arm 30 by merely securing the stop members 38 and 40 to the arm 30 by appropriate threaded fasteners at different axial positions along the actuator arm 30. Alternatively, the stop members 38 and 40 could comprise split collars that adjustably clamp around the arm 30.

Referring again to FIGS. 1 and 2, the connecting assembly 32 further comprises a flange member 42 which is secured to the tube 36. The flange member 42 is then pivotally secured via an arcuate link 100 and short link 102 to the cross arm 20.

More specifically, as best shown in FIGS. 1 and 2, the arcuate arm 100 is pivotally secured about a horizontal axis by a pivot pin 104 to the flange member 42. An upper end of the arcuate arm 100 is then pivotally secured about both a vertical and horizontal axis by a pivot assembly 106 to one end of the short link 102. The opposite end of the short link 102 is pivotally secured about a vertical axis by a pivot pin 108 to the end of the cross member 20 opposite from the vertical post 18.

The purpose of the arcuate arm 100 will be subsequently described. However, the short link 102 enhances or augments the transverse or horizontal movement of the actuator arm 30 perpendicularly from the post 18.

As can thus be seen, the multiple pivotal connections provided by the pivot pins 22, 104, 108 and pivot assembly 106, together with both the sliding and rotational attachment of the actuator arm 30 to the cross arm 20 by the tube 36, enables the actuator arm 30 to be accurately controlled along a number of degrees of freedom of movement. These multiple degrees of freedom of movement together with the vertical adjustment of the cross arm 20 by the channel member 24 enable accurate, easy, versatile and complete control of the position of the actuator arm 30.

With reference now especially to FIG. 1, an elongated linkage bar 50 is longitudinally slidably disposed to the interior 52 of the actuator arm 30. One end 54 of the linkage bar 50 is pivotally secured by a pin 56 to a plate 58 which, in turn, is pivotally secured by a pivot pin 60 to the actuator arm 30. An elongated handle 62 having a hand grip 112 at each end is then secured to the plate 58 so that pivotal movement of the handle 62 longitudinally displaces the linkage bar 50 relative to the actuator arm 30.

Figure 3:
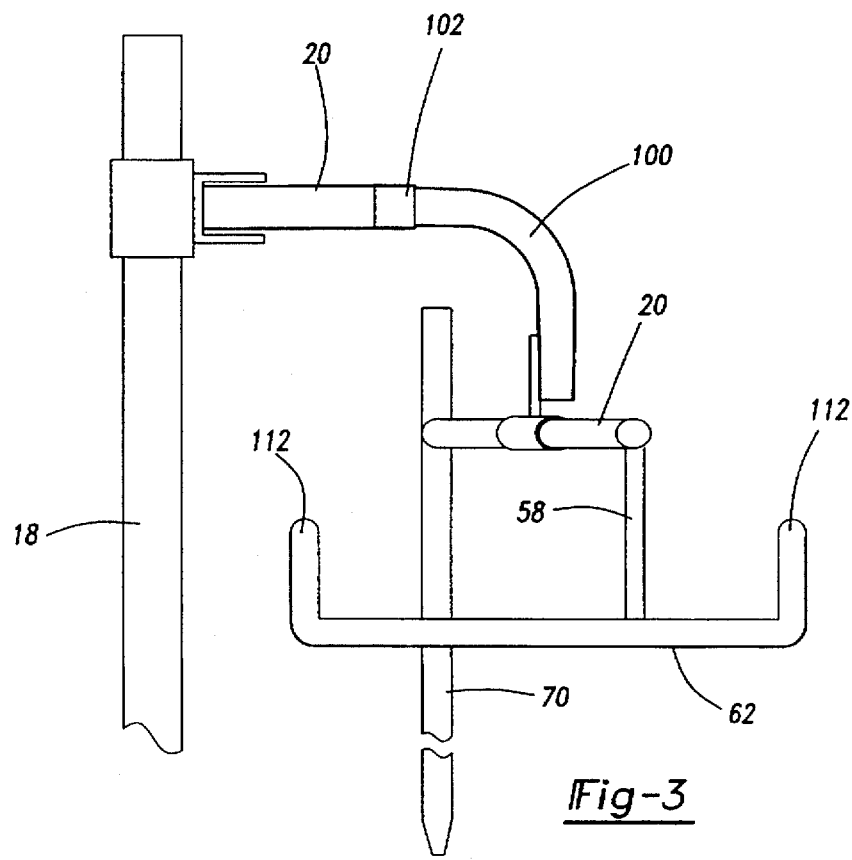
FIG. 3 is an end view taken along line 3—3 in FIG. 2 illustrating the preferred embodiment of the invention.

Referring now particularly to FIGS. 2 and 3, the plate 58 is secured to the handle 62 adjacent one of the hand grips 112 and thus at a position between the center of the handle 62 and one hand grip 112. In doing so, the actuator arm 20 is angularly offset between the center of the handle 62 and a welding gun 70 attached to the opposite end of the arm 20 so that an operator standing squarely behind the handle 62 has a clear vision of the welding gun 70. This unobscured vision of the welding gun 70 is further enhanced by the arcuate arm 100.

Referring again to FIG. 1, the opposite end 74 of the linkage bar 50 is secured by a pivot pin 76 to a welding gun bracket 72. The welding gun bracket 72 is also pivotally secured by a pivot pin 78 to the actuator arm 30. Furthermore, the welding gun bracket 72 is adapted to be secured to a welding gun 70 in any conventional fashion.

The pivotal connection between the linkage bar 50 and both the plate 58 and weld gun bracket 72 thus causes the welding gun 70 to pivot in unison with the pivotal movement of the handle 62. Such pivotal movement of the welding gun 70 can take place simultaneously with the axial, rotational or pivotal movement of the actuator arm 30 and cross arm 20. In doing so, the position of the welding gun 70 can be both accurately and remotely controlled.

It can therefore be seen that the welding device of the present invention provides a device for remotely controlling the position of a welding gun with not only great precision, but also versatility provided by multiple axis of movement of the welding device. Furthermore, due to the off center pivotal attachment between the handle 62 and the actuating arm 20, a clear and unobstructed view of the welding gun by an operator standing squarely behind the handle 62 is achieved. This unobstructed vision is further enhanced by the arcuate link 100.

Having described my invention, however, many modifications thereto will become apparent to those skilled in the art to which it pertains without deviation from the spirit of the invention as defined by the scope of the appended claims.

I claim:

1. A welding apparatus comprising:
   an elongated actuating arm,
   a welding gun,
   a main support having one end supported on a ground support surface,
   means for attaching said actuating arm to said main support,
   an elongated linkage bar extending through said actuating arm and having one end secured to said welding gun wherein axial movement of said linkage bar relative to said actuating arm moves said welding gun,
   an elongated handle having a hand grip on each end, said handle secured to said linkage bar adjacent a second end of said actuating arm for axially moving said linkage bar so that a longitudinal axis of said handle extends transversely with respect to a longitudinal axis of said linkage bar, said handle being secured to said linkage bar at a position between a center of said handle and one end of said handle.

2. The invention as defined in claim 1 wherein said main support comprises an elongated and vertically extending post and wherein said attaching means comprises an elongated cross arm, means for slidably securing one end of said cross arm to said post and means for securing the other end of the cross arm to said actuating arm.

3. The invention as defined in claim 2 wherein at least a portion of said actuating arm has an outer cylindrical periphery and wherein said means for securing the other end of said cross arm to said actuating arm comprises a tube axially slidably mounted to said portion of said actuating arm and means for pivotally securing said tube to said cross arm about a generally horizontal axis.

4. The invention as defined in claim 3 wherein said means for securing the other end of said cross arm to said actuating arm further comprises means for pivotally mounting said tube to said cross arm about a generally vertical axis.

5. The invention as defined in claim 4 and comprising means for pivotally mounting said one end of said cross arm to said post about a generally vertical axis.

6. The invention as defined in claim 4 and comprising means for vertically slidably mounting said one end of said cross arm to said post.

7. The invention as defined in claim 6 and comprising means for locking said cross arm to said post at an adjusted height.

8. The invention as defined in claim 3 wherein said actuating arm is axially slidably mounted to said tube within predefined limits.

9. The invention as defined in claim 7 and comprising means for adjustably setting said predefined limits.

10. The invention as defined in claim 1 and comprising means for adjustably securing said handle to said linkage bar.

11. The invention as defined in claim 2 wherein said means for attaching said actuating arm to said main support comprises an arcuate link pivotally secured at a first end to said actuating arm and pivotally secured at a second end to said cross arm.

12. The invention as defined in claim 11 and further comprising an extension link having one end pivotally secured to said cross arm and a second end pivotally secured to said arcuate link.

* * * * *